J. BLANCHARD.
VELOCIPEDE.
APPLICATION FILED JAN. 3, 1916.
1,268,918.
Patented June 11, 1918.
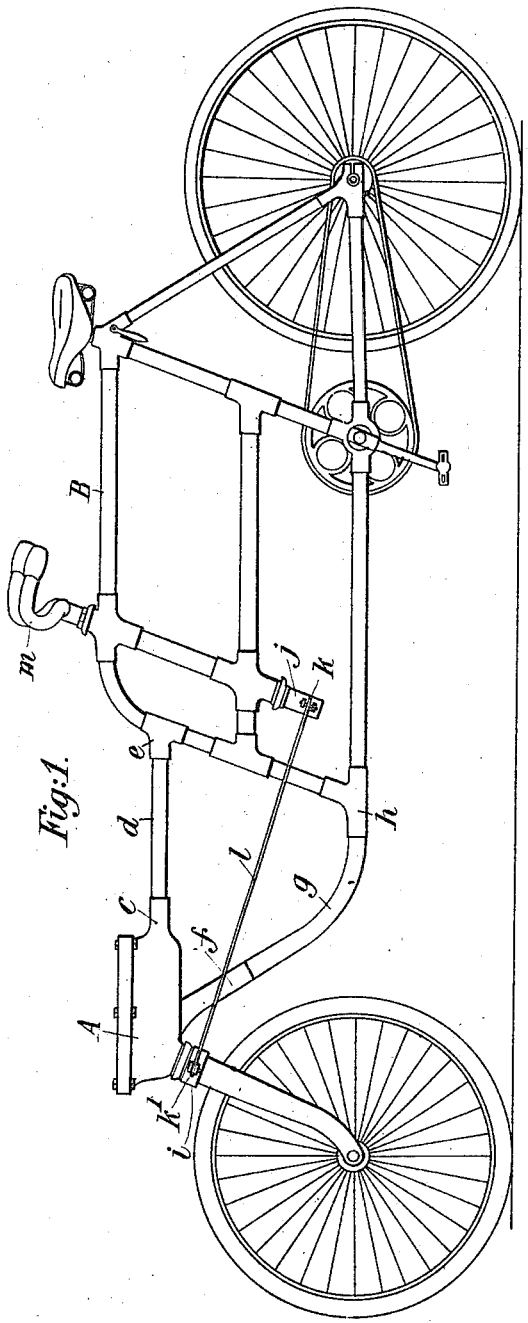
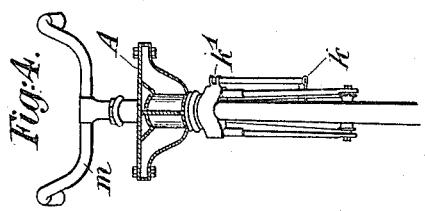
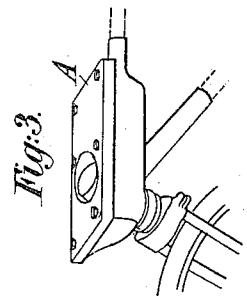
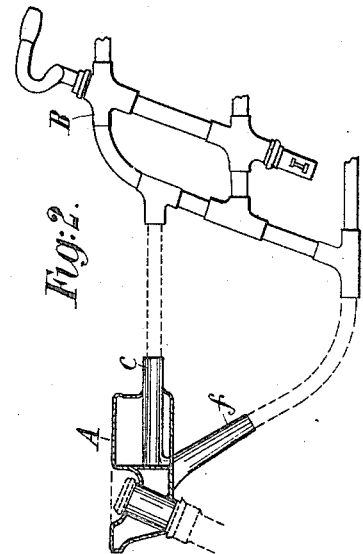
Inventor:
Jean Blanchard.
by R. Walden
his Attorney.

UNITED STATES PATENT OFFICE.

JEAN BLANCHARD, OF BORDEAUX, FRANCE.

VELOCIPEDE.

1,268,918.   Specification of Letters Patent.   Patented June 11, 1918.

Application filed January 3, 1916. Serial No. 70,053.

*To all whom it may concern:*

Be it known that I, JEAN BLANCHARD, an engineer and a citizen of the French Republic, 42 Cours Pasteur, Bordeaux, France, have invented certain new and useful Improvements in Velocipedes, of which the following is a specification.

The object of the invention is to provide a bicycle adapted to carry comparatively heavy loads in addition to the cyclist.

The invention essentially consists in constructing a bicycle with a carrier disposed over, and to the rear of, the front fork, the steering post being mounted in the frame behind the carrier and being connected to the front fork by a rod or equivalent means.

The invention is illustrated in the accompanying drawing, showing a preferred form of construction.

Figure 1 is a side elevation of the entire machine.

Fig. 2 is a side view showing portions of the frame and carrier.

Fig. 3 is a perspective view of the carrier.

Fig. 4 is a front view of the machine.

In the drawing A designates the carrier, and B the frame of the machine. The body of the carrier consists of strong tubing, with webs or flanges completing a frame work which is suitably incased. A portion of the carrier body forms the bearing for the front fork $i$. The carrier is thus located just over the rear part of the front wheel, which is a very favorable location for the load. The parts $c$ and $f$ of the carrier form sockets for two frame members $d$ and $g$, connected by lugs or T-pieces $e$ and $h$ to the inclined tubular member or bearing sleeve at the front of the frame.

The handle bar $m$ fixed to the steering post $j$ controls the front fork by means of a connecting rod $l$, which is pivoted to the post and fork at $k$ and $k^1$ respectively, said post being rotatably fitted in the aforesaid bearing sleeve.

With the construction shown the weight of the luggage is carried in the main by the front wheel, and weight of the cyclist by the rear wheel. This distribution of load is very favorable both in regard to stresses on the frame and wheels, and to the steering and equilibrium. The dead load does not in any way hamper the movements of the cyclist.

The invention is also applicable to motor cycles.

What I claim as my invention and desire to secure by Letters Patent of the United States is:—

In a bicycle or the like, the combination of a frame including an inclined, tubular front member or bearing sleeve; a steering post rotatably fitted in said sleeve; upper and lower forwardly-extending members fastened at their rear ends to said sleeve; a luggage-carrier connected to the front ends of said forwardly-extending members; a front wheel fork rotatably secured to said carrier in rear of the front end thereof; and a steering connection between said fork and said post; said carrier having its center of gravity disposed above and approximately in line with the axis of said fork, whereby the weight of the luggage in the carrier is substantially borne by the front wheel and tends to constantly maintain said front wheel in a vertical plane.

In witness whereof I have signed this specification in the presence of two witnesses.

JEAN BLANCHARD.

Witnesses:
 M. FAILLUF,
 WILLIAM P. SHOCKLEY.

Copies of this patent may be obtained for five cents each, by addressing the "Commissioner of Patents Washington, D. C."